(12) United States Patent
Marsot et al.

(10) Patent No.: US 7,010,790 B2
(45) Date of Patent: Mar. 7, 2006

(54) MODULAR METHOD AND DEVICE FOR THE TRACING OF A MULTIMEDIA MESSAGE THROUGH A TELECOMMUNICATIONS NETWORK

(75) Inventors: Rodolphe Marsot, Grenoble (FR); Jean-Charles San Severino, Saint Nazaire les Eymes (FR)

(73) Assignee: CEGETEL, Cedex (FR)

( * ) Notice: Subject to any disclaimer, the term of this patent is extended or adjusted under 35 U.S.C. 154(b) by 32 days.

(21) Appl. No.: 10/712,477

(22) Filed: Nov. 13, 2003

(65) Prior Publication Data

US 2004/0120311 A1 Jun. 24, 2004

(30) Foreign Application Priority Data

Nov. 20, 2002 (FR) ................................. 02 14556

(51) Int. Cl.
G06F 9/46 (2006.01)
(52) U.S. Cl. .................................... 718/105; 709/203
(58) Field of Classification Search ............... 370/246, 370/233, 235, 231, 234, 230, 232, 241; 702/182, 702/183, 186; 709/217, 231, 203
See application file for complete search history.

(56) References Cited

U.S. PATENT DOCUMENTS 5,841,982 A 11/1998 Brouwer et al. ....... 395/200.54
6,418,298 B1 7/2002 Sonnenfeld ................. 434/350
6,735,719 B1 * 5/2004 Moe et al. ..................... 714/38
2002/0087549 A1 * 7/2002 Mostafa ....................... 707/10
2002/0154244 A1 * 10/2002 Nakagawa et al. ...... 348/423.1
2003/0154300 A1 * 8/2003 Mostafa ...................... 709/231
2004/0097248 A1 * 5/2004 Schmidt et al. ............. 455/466
2004/0111476 A1 * 6/2004 Trossen et al. ............. 709/206
2004/0153513 A1 * 8/2004 Laumen et al. ............. 709/206

FOREIGN PATENT DOCUMENTS

| EP | 0866586 A1 | 9/1998 |
|---|---|---|
| WO | WO 99/18695 | 4/1999 |
| WO | 02058359 | * 7/2002 |

* cited by examiner

*Primary Examiner*—Ajit Patel
*Assistant Examiner*—Steven A Blount
(74) *Attorney, Agent, or Firm*—Perman & Green, LLP

(57) ABSTRACT

To measure the performance of a system for the transmission of multimedia messages, a parametrizable module for the generation of multimedia messages is used. The subject field of the multimedia messages produced by the generation module comprises information on the multimedia message. This subject field is retrieved in the notification messages sent by a relay server. These notification messages are filtered by a filtering module. (206). The result of the filtering is given by a module (202) for the retrieval of multimedia messages. The result of the retrievals is compared with the sending operations made by an analysis module (203) to produce statistics on the working of the system.

21 Claims, 4 Drawing Sheets

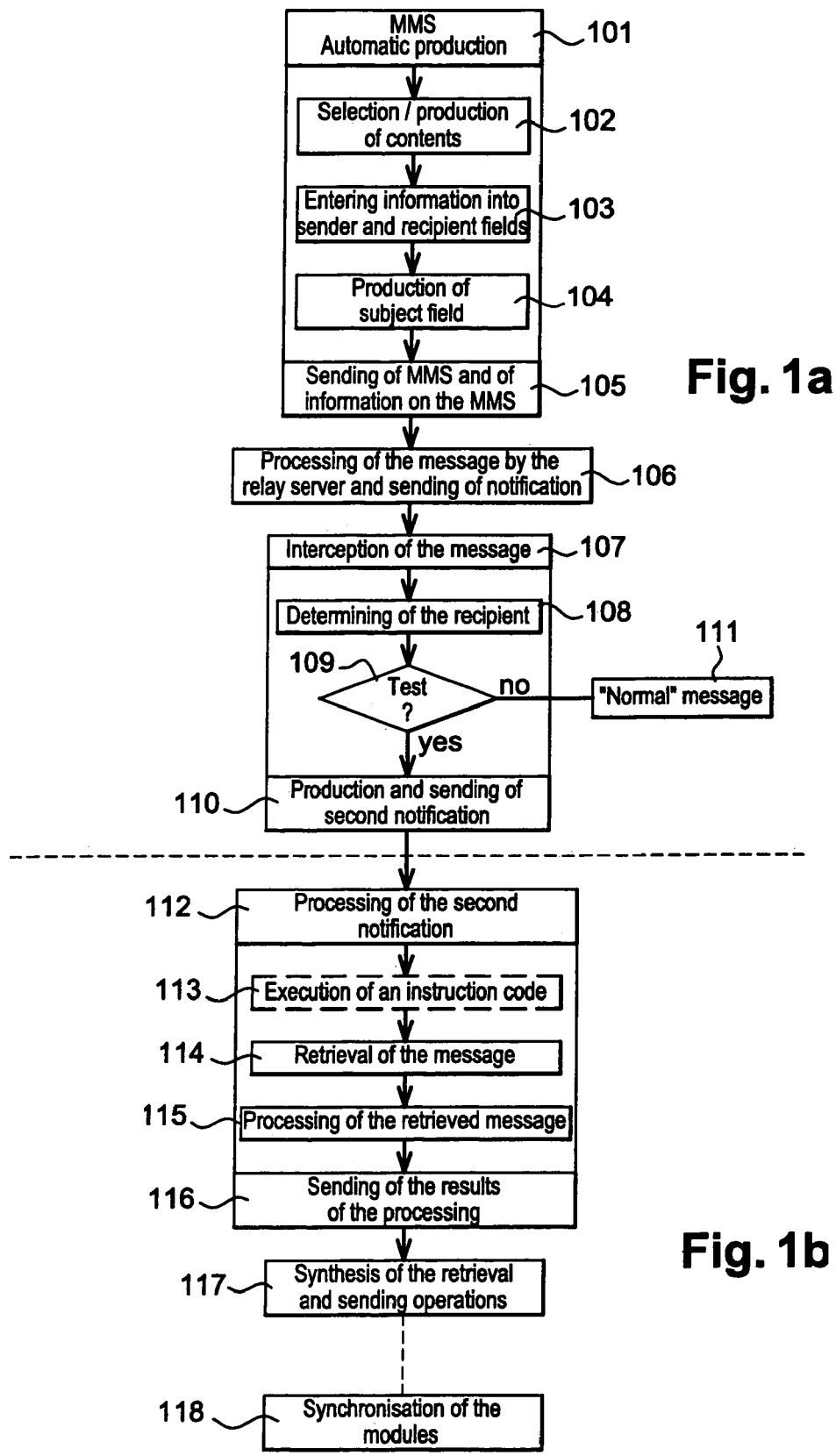

MODULAR METHOD AND DEVICE FOR THE TRACING OF A MULTIMEDIA MESSAGE THROUGH A TELECOMMUNICATIONS NETWORK

BACKGROUND OF THE INVENTION

1. Field of the Invention

An object of the invention is a modular method and device for tracing a multimedia message through a telecommunications network. The field of the invention is that of telecommunications and more specifically that of communications via messages having a multimedia content. Such messages are also called multimedia messages or MMS messages.

It is an aim of the invention to be able to determine the performance of a system for the exchange of multimedia messages.

It is another aim of the invention to be able to have measurement/simulation tools available during the phases of developing a system for the exchange of multimedia messages.

It is another aim of the invention to be able to make measurements on a system for exchanges of multimedia messages, this system being in the operating phase.

It is another aim of the invention to determine a time limit for the routing of a multimedia message.

It is another aim of the invention to detect the deterioration undergone by a multimedia message while it is being routed.

2. Brief Description of Related Developments

In the prior art, there are known methods and devices to carry out load simulations on HTTP (Hyper Text transfer Protocol) servers. Such methods implement programs called robots that interrogate an HTTP server by sending requests on the server. This is a customer-server process in which only the robot/client and the server are involved. It is therefore possible in this way to know whether the interaction between the server and the robot is taking place properly, but no information is obtained on the other communications implemented during exchanges of MMS-type multimedia messages. In particular, no information is obtained on the time limits for the transmission of a multimedia message. Such a time limit is measured from the date when such a message is sent by a customer to the date of its reception by the recipient. Similarly, with an approach of this kind, it is impossible to determine which types of multimedia messages are lost, since the type of message varies with the nature and quantity of the data that it contains. With an approach of this kind, it is still impossible to know whether a multimedia message sent has been properly received, namely whether the received message is identical to the sent message. Finally, the prior art solutions envisage only HTTP protocol communications whereas, in fact, there are many protocols by which a multimedia message can be transmitted.

The invention resolves these problems by implementing a method and modular device, each module having a specified role. Thus, a generation module produces and sends variable type multimedia messages on a telecommunications network in using a variety of communications protocols including HTTP, WAP (Wireless Application Protocol), SMTP (Simple Mail Transfer Protocol), SOAP (Simple Object Access Protocol), to mention only the most common protocols. A generation module of this kind is incapable of simulating the functioning of large number of customers. It is indeed possible to send out the multimedia message from an office computer, a pocket computer, a personal digital assistant and a mobile telephone to mention only the most common types of customers. The message produced comprises at least one body and a subject field. The generation module enters information into the subject field as a function of the type of multimedia message produced. Thus the subject field comprises a multimedia message identifier, a date for the production and sending of the multimedia message, an instruction code for a retrieval module, and/or a checksum of the multimedia message. The generation module also sends information to an analysis module on the multimedia messages that it produces and sends.

These multimedia messages that are produced and sent travel through the telecommunications network and are received and processed normally by a multimedia message relay server. The processing consists of a storage of the message and of the sending of a notification message to the recipient of the multimedia message received and stored. This notification message comprises at least the subject field of said multimedia message.

This notification message is intercepted by an interception module that either allows it to continue its route toward its recipient if it is not a message produced by the generation module or else sends it to a multimedia message retrieval module.

The retrieval module then has knowledge of information enabling it to interrogate the relay server to retrieve the multimedia messages produced and sent out by the generation module. This retrieval makes it possible to obtain information, especially on the integrity of the retrieved multimedia messages and on the transmission times. The information thus obtained is then transmitted to an analysis module already possessing information on the messages sent. The correlation between the information on the messages sent and the information on the messages retrieved therefore makes it possible to obtain statistics modeling the behavior of the telecommunications network in its function of routing multimedia messages.

Thus, this method/device can be used either during the integration of an MMS service to carry out load and endurance tests or in production to measure the real availability of the system. A load test consists in determining the behavior of the server when it subjected to heavy demand in a short period of time. An endurance test consists in determining the behavior of the server over a lengthy period of time. It is possible of course to combine load and endurance tests to determine the behavior of a server subjected to heavy demand over a lengthy period of time.

SUMMARY OF THE INVENTION

An object of the invention therefore is a modular method for the tracing of a multimedia message through a telecommunications network comprising a relay server of multimedia messages, a multimedia message comprising a recipient field and a subject field wherein:

the multimedia message is produced automatically by a multimedia message generation module;

the generation module inserts information in the subject field of the multimedia message on the automatically produced multimedia message, the multimedia message produced is sent through the telecommunications network, the multimedia message produced and sent is received by the relay server, the relay server produces and transmits a first message of notification of reception of the multimedia message to a recipient identified by the recipient field, the first notification message comprising a subject field whose contents comprise at least the information on the subject field of the multimedia message.

An object of the invention is also a modular method for the tracing of a multimedia message through a telecommunications network comprising a multimedia message relay server, a multimedia message comprising a recipient field and a subject field, wherein:

an interception module intercepts a notification message sent by the relay server following the reception of the multimedia message, and determines which is the recipient of the first notification message and, as a function of the recipient, behaves transparently in the telecommunications network or sends a second notification message addressed to a multimedia message retrieval module, the second notification message comprising at least one subject field whose contents enable the identification of the multimedia message corresponding to the first notification message, the retrieval module produces a retrieval request to retrieve the multimedia message corresponding to the second notification message, and the retrieval module sends the retrieval request to the relay server and processes the response of the relay server.

An object of the invention is also a modular device for the tracing of a multimedia message through a telecommunications network comprising a multimedia message relay server, a multimedia message comprising a recipient field and a subject field, wherein the modular tracing device comprises:

a generation module for the automatic production of a message, the generation module comprises means for the insertion, in the subject field of the multimedia message, of information on the automatically produced multimedia message, the generation module comprises means to send the multimedia message produced through the telecommunications network, the relay server comprises means for the production and the transmission, to an identified recipient, of a first message of notification of reception of the multimedia message, the first notification message comprising a subject field whose contents comprise at least information of the subject field of the multimedia message, an interception module comprising means to intercept the first notification message, determine which is the recipient of the first notification message, and, depending on the recipient, behave transparently in the telecommunications network or send a second notification message to a multimedia message retrieval module, the second notification message comprising at least one subject field whose contents enable the identification of the multimedia message corresponding to the first notification message, the retrieval module comprises means to produce a retrieval request to retrieve the multimedia message corresponding to the second notification message, the retrieval module comprising also means to send the retrieval request to the relay server and process the response of the relay server.

BRIEF DESCRIPTION OF THE DRAWINGS

The invention will be understood more clearly from the following description and the accompanying figures. These figures are given by way of an indication and in no way restrict the scope of the invention. Of these figures:

FIGS. 1a and 1b illustrates steps of the method according to the invention;

DETAILED DESCRIPTION OF THE PREFERRED EMBODIMENT(S)

FIG. 1 illustrates steps of the method according to the invention. Each step or group of steps is implemented by a module because it is a modular method/device. Each module has one or more functions to fulfill. In practice, and as shown in the FIG. 2, each module is in fact an independent, server-type machine. Such a machine comprises a microprocessor, program, storage and working memories, and means of connection, especially to a telecommunications network. In this case, the program memory of the server/module comprises instruction codes to implement functions of the module. In this case again, the modules communicate through a telecommunications network, or a local area network depending on the distance between the servers. When nothing is specified, it is assumed that two modules communicate with each other through a TCP/IP type protocol for example. However, in variants, it may happen that functions corresponding to several modules are executed by a same server. This means then that the program memory of such a server comprises instruction codes corresponding to the functions of several modules. In this case, the modules communicate through internal units, buses and memories of the server. In the description, when an action is attributed to a module, this action is actually performed by a microprocessor controlled by instruction codes. In one variant, it is a specialized component dedicated to the performance of the function of the module.

The term "multimedia message" is understood to mean an MMS (Multimedia Message Service) type message. It may be recalled here that the MMS service is an interpersonal communications service offering internal mechanisms for the storage and onward transmission of multimedia messages. These multimedia messages may contain text, sound (in the form of files in the mp3, ogg, wav or other formats), still or moving pictures (in the form of files in the jpeg, gif, mpeg, divx, and other formats), the entire message being shaped by the SMIL (Synchronized Multimedia Integration Language) presentation language. Other shaping languages may be used such as the HTML (Hyper Text Markup Language) or Cascaded Style Sheet (CSS) which are the best known of these other languages.

These multimedia messages travel through a telecommunications network between a sender and a recipient. A telecommunications network of this kind has all the infrastructures used to route these multimedia messages.

Figure 3A:
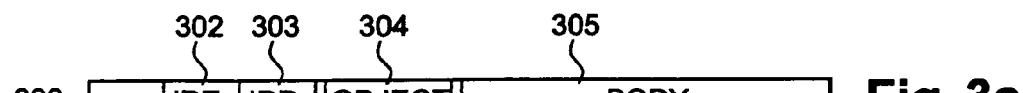
FIGS. 3a to 3f illustrate structures of messages and requests sent and received during the implementation of the method according to the invention.
Figure 3B:
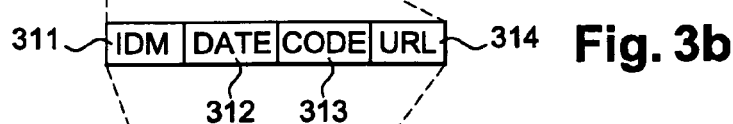
Figure 3C:
Figure 3D:
Figure 3E:
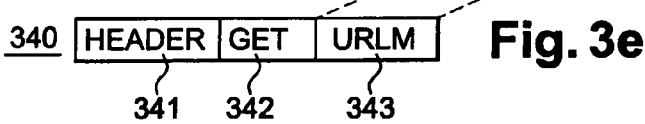
Figure 3F:
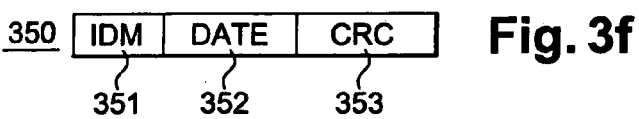

FIG. 1 shows a step 101 for the automatic production and sending of a multimedia message. The step 101 is implemented by the multimedia message generation module 201. One function of the generation module 201 is to produce a multimedia message comprising a certain number of fields. FIG. 3a illustrates fields contained in the multimedia message. A multimedia message 300 comprises a header field 301. The field 301 comprises, inter alia, a field 302 identifying the sender of the message 300 and a field 303 identifying the recipient of the message 300. The message 300 also has a field 304 that is the subject of the message and a field 305 that is the body of the message.

The step 101 has several sub-steps to enter information into the different fields of the message 300. In one sub-step 102, the generation module 201 provides information to the body field 305. The field 305 contains the data of the multimedia message formatted according to an SMIL type language. This is the generation module, parametrized by a user, which determines the type of data that will be presented in the body 305 of the message 300. This data consists of text, sound, and/or moving/still pictures. This data is presented in a variable quantity depending on the test to be performed. It is thus possible to test the behavior of the telecommunications network for messages comprising only one medium, several media, little data, and/or a great deal of data. The body is either composed by hand by the user, or read in a table/library comprising a certain number of possible contents for the body, or produced by the module 201 as a function of a size parameter for example. In the latter case, this is a simple padding of the body 305. In the case of the use of a library, this library is recorded in the memory to which the generation module 201 has access.

From the sub-step 102, the method passes to a sub-step 103 in which the generation module 201 provides information to the sender field (IDE) and the recipient field (IDD) of the multimedia message 300. These fields include identifiers of a person, or more exactly of the contract existing between a physical person and an operator of the telecommunications network. These identifiers are electronic identifiers such as an electronic mailbox (e-mail), a telephone number, an Internet address, or any other form of identification currently used on the telecommunications network. In the present description, it is considered that the identifier IDD is a telephone number while the identifier IDE is either an e-mail address or, respectively, a telephone number depending on whether it is sought to simulate a sending of multimedia message by computer or respectively by a telephone set. The identifiers IDD and IDE are selected by the generation module 201 from a predefined list of identifiers. This list enables a filtering to be made among the multimedia messages traveling through the telecommunications network. These identifiers IDD and IDE may also be specified by a user implementing the generation module 201.

From the sub-step 103, the operation goes to a sub-step 104 for the production of the subject field 304 of the message 300. The subject field comprises information on the multimedia message produced by the generation module 201. This information is not a summary, in natural language, of the nature of the message 300. A natural language is a language such as French or English. This information is formal information that can be used directly and without ambiguity in an automated processing method. The fact that this information can be represented by characters decipherable by an individual changes nothing here. This information consists of an identifier of multimedia messages used to identify the message 300 from among all those produced by the generation module 201. This identifier is recorded in a field 311 of the field 304. This identifier is obtained, for example, by the incrementation of a counter by the generation module 201. Each message produced then has a different identifier. This counter can be reset by action on the part of a user or at the end of a predetermined period of time. An identifier of this kind can also be produced by a function taking a date as a parameter and guaranteeing the unified nature of the identifier. In the field 304, the fields 311 to 314 may be distinguished in several ways. A first way is to assign a fixed size to each field. A second way is to structure these fields 311 to 314 according to an XML (extended Markup Language) language, each field being then demarcated by an opening tag and a closing tag. These two possibilities, as well as others, are open for all the fields described in the description.

The subject field 304 also comprises a date field indicating the date on which the message has been produced and sent. This field has a resolution at least to within one second and enables the definition of a date in terms of year, month, day, hour and second. In one variant, the fraction of the second in which the production-emission has taken place is added. For tests extending over a short period, it is possible to dispense with information pertaining to a year or a month. However, this information pertaining to years and months is useful for tests that overlap two years or two months.

The subject field 304 also has an instruction code field 313 for a multimedia message retrieval module 202. This field 313 is interpreted by the retrieval module 202. An instruction code of this kind is, for example, a period of latency that the retrieval module must allow to elapse before retrieving a multimedia message. Another possible instruction code is that of not retrieving the multimedia message.

The subject field 304 also has a checksum field 314. The field 314 has a checksum of the field 305. This checksum field is computed by the generation module 201 as a function of the contents of the field 305 determined at the sub-step 102.

In one variant, the field 304 has only the field 311. This makes it possible to obtain a piece of information on whether or not the message has been routed to its recipient. Each of the other fields 312 to 314 brings additional information on the routing of the messages. This information relates chiefly to the duration and integrity of the transmission.

From the sub-step 104 the method passes to a sub-step 105 for sending the message 300. The generation module 201 sent the message 300 according to a protocol used to simulate the working of an apparatus used by the public for sending multimedia messages. In this case the public is either a private individual, or a firm or a content supplier wishing to send multimedia messages. These protocols include the HTTP, SMTP, SOAP, WAP protocols but there are others. The protocol used for the sending of the message 300 is parametrized by a user implementing the module 201. The module 201 therefore has means to communicate according to these different protocols. These means are known since many apparatuses already communicate through these protocols.

The other parameters of the module 201 include the number of multimedia messages to be sent per second, and the period of time during which the module sends messages. These two parameters make it possible to carry out load and endurance tests. Once parametrized, the generation module 201 therefore sends out one or more multimedia messages, through one or more protocols, to one or more recipients at a given frequency and for a given period of time. These messages are sent through the telecommunications network to which the module 201 is connected and for which it is sought to assess the transmission performance characteristics for the routing of multimedia messages.

For each message that it sends, the module 201 knows its parameters which are at least: the identifier 311, the date 312, the code 313, the checksum 314, the contents of the fields IDE, IDD, 305, and the protocol used. This information is sent to a result analysis module 203. This data will be correlated with the data collected by the retrieval module 202.

One alternative way of parametrizing the behavior of the module 201 is to use a scenario. The module 201 then has means, in the form of instruction codes, to interpret scenarios enabling the implementation of the means for the production/sending of multimedia messages from the module 201. Such a scenario takes the form, for example, of a file in the XML format. It may have the following form:

Example of a Scenario: Scenario.xml File

```
00 <?xml version="1.0" encoding="utf-8">
01 <!DOCTYPE scenario SYSTEM "scenario.dtd">
02 <scenario title="title of scenario"description="description of the scenario">
03 <title sequence="multiprotocol sequence" description="sequence during which multimedia messages are sent according to several protocols" duration="198">
04 <trafficProfile
05 title="pdt1"
06 frequency="f1"
07 MMSname="mms1"
08 protocol="smtp"
09 retrievalTime="2"
10 />
11 <trafficProfile
12 title="pdt2"
13 frequency="f2"
14 MMSname="mms2"
15 protocol="wap"
16 retrievalTime="0"
17 />
18 </sequence>
19 <title sequence="monoprotocol sequence"description="sequence implementing only one protocol" duration="256">
20 <trafficProfile
21 title="pdt3"
22 frequency="f3"
23 MMSname="mms3"
24 protocol="wap"
25 retrievalTime="1"
26 />
27 </sequence>
28 </scenario>
```

The scenario.xml file thus enables the description of a scenario defining the behavior of the module 201. Here below, the word "line" is used to refer to a line of the scenario.xml file. The line 01 corresponds to a standard header depending on the version of the XML language used.

The line 02 specifies a grammar file enabling an interpretation program to verify that the syntax of the scenario.xml file truly complies with what this interpretation program expects.

It may be recalled here that an XML can be likened to a tree, namely to a set of hierarchically organized objects. Thus the scenario.xml file describes a scenario between its opening and closing tags, namely between the lines 03 and 28. The scenario.xml tag comprises a scenario object which itself comprises sequence objects. Each sequence object comprises one or more trafficProfile objects. Furthermore, each object has one or more properties.

In the present example, the scenario object comprises title and description properties. Here, a title enables the identification of an object and a description enables an object to be described more or less briefly. In the present example, the scenario object has two sequence objects. In practice, the scenario object has any number whatsoever of sequence objects.

A sequence object has a title, a description and a duration. The duration is a number expressed, for example, in seconds. In one variant, another unit may be used such as minutes, tenths of a second or any fraction of a second. The duration expresses the time during which the module 201 must execute the instructions of the trafficProfile objects contained in the sequence object in question. If duration is equal to 198, then the module 201 will execute the instructions of the trafficProfile contained in the sequence object whose duration is equal to 198 for 198 seconds.

The scenario.xml example shows a sequence object comprising two trafficProfile objects and a sequence object comprising one trafficProfile object. In practice, a sequence object comprises any number whatsoever of trafficProfile objects.

A trafficProfile comprises several properties including a title, a frequency, a multimedia message name, a protocol and a retrieval time limit. The interpretation of a trafficProfile object therefore consists of the production of a multimedia message whose structure is identified by the name of the multimedia message. This name has a corresponding size, structure and one or more types of contents. The frequency corresponds to the frequency at which the multimedia message corresponding to the trafficProfile object must be sent. The protocol corresponds to the protocol according to which the multimedia message corresponding to the trafficProfile object must be sent. The retrieval time corresponds to an instruction for the module 202. The retrieval time is therefore used for the production of the contents of the field 313.

The scenario.xml example corresponds to a succession of two message-sending sequences. A first sequence lasts 198 seconds during which the module 201 generates two types of traffic. The first type of traffic is described by the trafficProfile object identified by the title "pdt1", the second type of traffic is described by the trafficProfile object identified by the title "pdt2". The first type of traffic then corresponds to the sending, at the frequency f1, of messages identified by the message name "mms1" according to the "smtp" protocol. The second type of traffic then corresponds to the sending, at the frequency f2, of messages identified by the message name "mms2" according to the "wap" protocol. Once the duration of the pre-described sequence object has elapsed, the traffic corresponding to it is interrupted and then the instructions corresponding to the next sequence in the scenario.xml file are executed. Traffic corresponds here to the sending of a given message at a given frequency. The following sequence, whose title is a "monoprotocol sequence", comprises only one trafficProfile object which is interpreted as here above for the first sequence.

Henceforth, the word "line" no longer makes explicit reference to a line of the scenario.xml file, unless explicitly stated.

The module 201 can therefore be parametrized either on the fly via a user interface, or through a configuration file equivalent to the scenario.xml file. A user interface is used to enter data for the launching of the program, or as and when the program needs it. A configuration file is equivalent to the scenario.xml file if it comprises at least one instruction whose interpretation prompts the sending of one or more multimedia messages by the module 201.

From the sub-step 105, the method passes to a step 106 for the processing of the message by a relay server 204. A relay server is also commonly called an MMS-C, or Multimedia Messaging Service Central. The module 201 and the relay server 204 are connected through the telecommunications network. If this connection is made through the WAP protocol then, between the module 201 and the relay server 204, there is a WAP interface gateway 205 between the module 201 and the relay server 204. This is the case where the module 201 simulates the behavior of one or more mobile telephones sending multimedia messages. In this case, the communication between the module 201 and the gateway 205 is made through a part of the cell network type of communications network. This result is obtained, for example, by using GSM, GPRS, or UMTS modems to enable the module 201 to send the multimedia messages produced.

With a view to simulating the sending of multimedia messages from a mobile telephone, the modules 201 and 202 can partially or entirely simulate the behavior expected by the gateway 205. Two situations can be distinguished:

the module 201, or 202, is connected to the telecommunications network in data mode, according to the CSD, GPS, UMTS or any other standard. The management of addressing, authentication and any other network problem is then done by the infrastructure of the telecommunications network, especially by installations known as SGSN/GGSN in the case of the GPRS/UMTS standards. The module 201 then limits itself to sending multimedia messages over the WAP protocol without any constraint. The module 202 then limits itself to receiving multimedia messages over the WAP protocol without any constraint. This is a full simulation.

the module 201, or 202, is directly connected to the server/relay 204 or to the gateway 205 directly through the TCP/IP protocol. This is the case especially for tests of performance where it is sought to measure the quality of service of the relay server 204, or of the relay server 204 associated with the gateway 205. In this case, the module 201 manages the functions of the telecommunications network so that this direct connection is transparent for the relay server 204 and/or the gateway 205.

Thus the modules 201 and 202 enable the simulation either solely of the sending/reception of multimedia messages above the WAP protocol, or the simulation of all the messages received by the relay server 204 and the gateway 205.

To be able to simulate the use of the telecommunications network by several customers that are mobile telephone, personal assistant or other types of customers, the module 201 in one variant has a multiprocess type of software architecture. A synonym of multiprocess is multitask. The module 201 is therefore capable of executing several processes simultaneously, each process having the function of sending a multimedia message and therefore of carrying out at least the step 106. In practice, a process has knowledge of the elements produced at the steps 102 to 104 and, in one variant, the process performs these steps. Each process can then be likened to a customer of the telecommunications network. On this basis, each process/customer has resources allocated to it in order to be able to communicate on the telecommunications network. One of these resources, especially in the case of communications according to the WAP protocol, is an Internet address. To the extent that the module 201 is a multiprocess module it has several Internet addresses assigned to it. In fact, it has one address per active process. In practice, when the module 201 interprets a sequence of a scenario, it creates as many processes as the sequence object has trafficProfile objects. In one variant, each multimedia message is sent by a different process. This variant enables the simulation of the connection of a large number of customers to the telecommunications network. This enables a simulation different from the one that consists in simulating a customer sending a large number of multimedia messages. The term "large number" refers here to the ability to send several tens of multimedia messages or even a hundred multimedia messages per second. In practice, if a greater capacity needed, it is possible either to increase the power of the microprocessor included in the module 201, or to use several modules such as the module 201. The use of several modules of one type also extends to other modules namely interception, retrieval and analysis modules.

Figure 4:
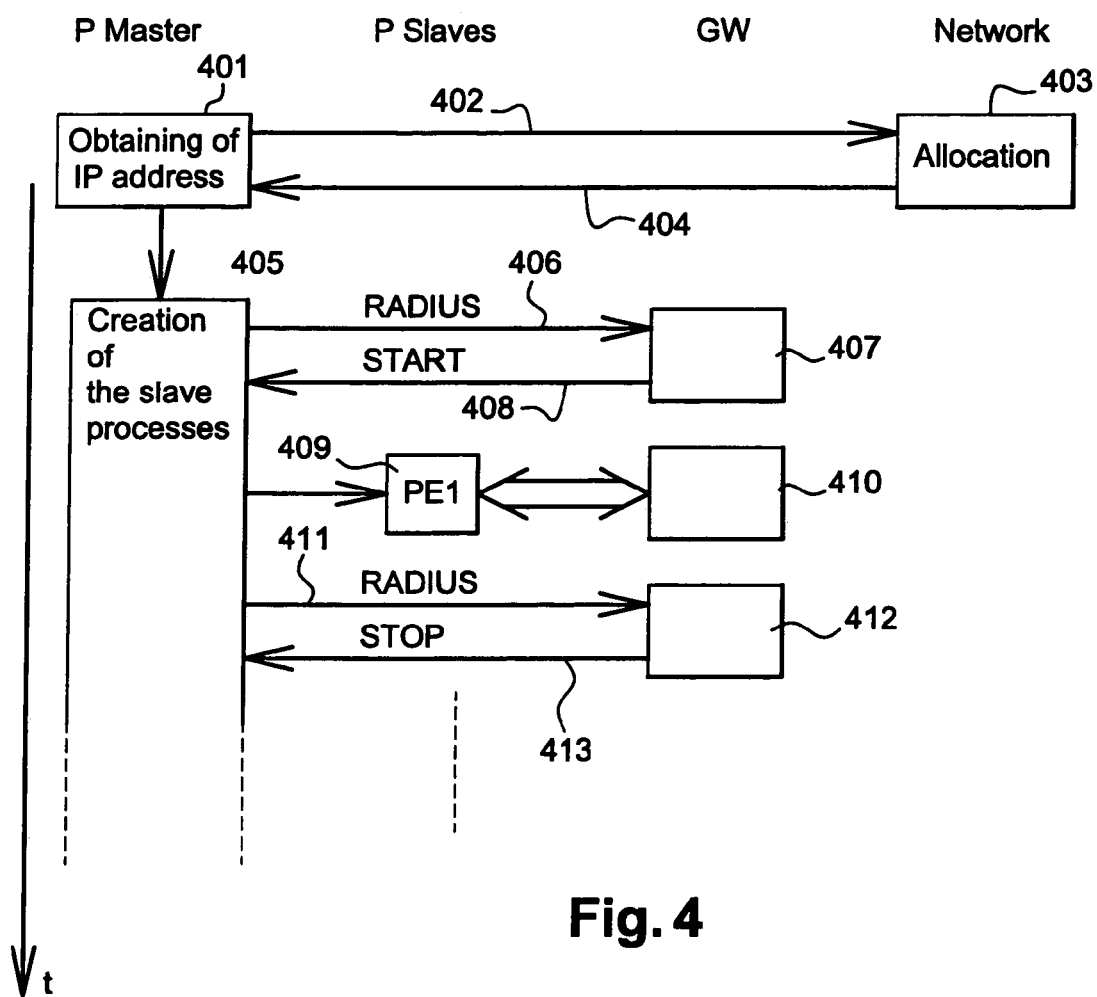
FIG. 4 illustrates a multiprocess functioning of the generation module.

FIG. 4 illustrates a multiprocess functioning mode for the module 201 in the context of the simulation of communications involving several customers on the telecommunications network. FIG. 4 shows a preliminary step 401 in which a master process of the module 201 obtains Internet addresses in sending a resource allocation request 402 to the infrastructure of the telecommunications network. In response to the request 402, the telecommunications network, through a step 403, send a response 404 to the request 402. The response 404 comprises a list of Internet addresses that can be used by the master process. From the step 401, the method passes to a step 405 for the creation of the slave processes. The slave processes, like the master process, are programs executed by the module 201. Each process has a lifetime. The master process has an infinite lifetime, or at least a lifetime equal to the execution of commands parametrized by the user of the module 201. The slave processes have a lifetime equal to the duration of the task assigned to them by the master process.

The master process sends, via the gateway 205, a message 406 known as RADIUS Accounting START. The message 406 has an Internet address at the parameter. This is one of the Internet addresses obtained at the step 401. The parameter of the message 406 is also a telephone number identifying a client of the telecommunications network. In a step 407, the gateway 205 processes the message 406 and sends a response 408 to the message 406. The master process is then capable of creating a slave process by sending it, firstly, all the information necessary for the production of the multimedia message and, secondly, all the information necessary for setting up a call with the gateway 205. This information for the communications is indeed contained in the response to the message 406. The information for the production of the multimedia message is obtained through the parametrization of the module 201. In the step 409, the slave process therefore performs the actions described for the step 101. The step 409 is carried out in communicating with the gateway 205, which performs the appropriate actions in the step 410.

The slave process comes to an end when the multimedia message has been sent. The master process than sends a RADIUS Accounting STOP message 411 to inform the gateway 205 that the resources allocated for the communication with the slave process may be released. The gateway 205 responds, through a step 412, by a message 413 signifying that the message 411 has truly been processed.

The sequencing of the actions 406 to 413 is repeated as many times as there are slave processes to be created for the execution of the task parametrized for the module 201. Each slave process is independent of the others. Several slave processes can coexist in time.

The module 202 can also work according to the same scheme. In this case however multimedia messages are not sent at the step 409, but retrieved. The step 409 is then equivalent to a step 112 whose description is to come.

This multiprocess architecture is not unique. Thus, in another variant, the management of the radius messages is left to the responsibility of the slave processes themselves. In another variant, the obtaining of the network resources, namely at the step 401, is itself also left to the responsibility of the slave processes. In the latter case, a slave process can be totally likened to a customer of the telecommunications network. In any case, the WAP and/or the MMS-C relay server have the impression of having to deal with several network customers.

Another variant for the module 201 and/or 202 is an iterative sequential software architecture. That is, the sub-steps of the step 101, and/or 112, are carried out one after the other so long as a stop condition has not been reached. A stop condition of this kind is, for example, a sending duration, a number of messages or an equivalent condition. In the sequential mode of operation, the module 201, after having executed the sub-step 105, starts again at the first sub-step of the step 101 so long as the stop condition has not been reached. It is obviously possible to mix the two types of software architectures.

For the step 106, it is noted that the relay server 204 is a standard device of the telecommunications network. As such, it behaves in a standard way when it receives a multimedia message. This behavior consists in recording the multimedia message received in a storage memory after having assigned it an URLM identifier. Then the relay server 204 composes and sends a notification message to the recipient of the multimedia message. This recipient is identified by the field 303 of the multimedia message.

The notification message 320 produced by the relay server 204 comprises a header 321 which comprises at least fields 322 and 323 respectively, equivalent to the fields 302 and 303 respectively. The message 320 also has a subject field 324 identical to the field 304. The notification message 320 also comprises an identifier field 325 enabling the transmission of the URLM identifier. The notification message 320 has other pieces of information, in particular, a piece of information used to identify this message as a notification message pertaining to the reception of the multimedia message. Once the message 320 has been produced, it is sent, through the telecommunications network, to the recipient of the multimedia message that has prompted the production of the notification message. The first notification is encoded in binary mode or in text format depending on the type of recipient terminal.

The field 325 is produced by the relay server 204 or the gateway 205 depending on the type of recipient terminal. In practice, this field comprises a URL (Universal Resource Locator) used to access the multimedia message corresponding to the relay server 204. In practice, the invention is compatible with other types of data for the field the field 325, and these types of data enable the identification of the multimedia message.

In the example of the description, the recipient is identified by a telephone number and the notification message 320 is therefore sent as one or more short messages also known as SMS (Short Message Service) messages. However, the message 320 can also be sent through protocols such as SMPP (Short Message Peer-to-Peer) type messages or UCP (Universal Computer Protocol) type messages.

From the step 106, the operation passes to a step 107 for the interception of the notification message 320 by an interception module 206. The step 107 is carried out for each notification message sent at the step 106. In a preferred variant, the module 206 is connected in the telecommunications network between the relay server 204 and a short message service center (SMS-C) device 207. The SMS-C device is responsible for the accurate routing of the SMS messages to their final destination.

The module 206 intercepts all the notification messages sent out by the relay server 204. This enables the module 206, in a sub-step 108, to obtain knowledge of the contents of the field 323 that is the recipient of this notification message. The knowledge of this field makes it possible to determine whether it is a notification message resulting from the sending of the multimedia message by the module 201. Indeed, the module 206 knows the list of addresses used by the module 201 in the sub-step 103. It is therefore easy to determine whether the recipient is actually a fictitious recipient due to the module 201. For the step 107, it is actually a filtering of the messages sent by the relay server 204.

In one variant, the filtering is done on the field 322. In another variant, the filtering is done on the field 324. Owing to its nature, the field 324 indeed has a particular structure that can be easily detected. The detection of the structure makes it possible to sort out the notification messages and determine those due to multimedia messages sent by the module 201. In other words, the detection of this structure makes it possible to determine the fact that the destination of the notification message is actually the module 202.

From the sub-step 108, the method passes to a routing sub-step 109. If the sub-step 108 has enabled the classification of the intercepted notification message from among those resulting from the sending of the multimedia message by the module 201, then the method passes from the sub-step 109 to the sub-step 110 for the production/sending of the second notification message. If not, the operation passes from the sub-step 109 to a step 111 in which the notification message 320 continues its normal route. In this case, the module 206 is transparent in the telecommunications network.

In the sub-step 110, the module 202 produces a second notification message 330. The notification message 330 is addressed to the multimedia message retrieval module 202. The contents of the message 330 enable the retrieval module 202 to retrieve the multimedia message corresponding to the notification message 320. The message 330 therefore has at least one field 335 whose contents are identical to the contents of the field 325. The notification message 330 also has a header proper to the protocol used for communication between the modules 206 and 202. If the field 320 has an instruction code for the module 202, then the message 330 has a field for the transmission of this very same code. In one variant, all or part of the fields 322 to 324 are transmitted through the message 330. The module 202 can also insert the date of reception of the notification in the field 326. The message 330, once constituted, is sent to the retrieval module 202.

In one variant, the module 206 is located in the telecommunications network beyond the SMS-C device. This means that the notification messages sent by the relay server 204 are first seen by the SMS-C device. In this case, the module 206 behaves like an apparatus that can be contacted through the identifiers 323 of the notification messages.

The step 111 is a step in which the module 206 sends the notification message 320, this message 320 being unchanged by the module 206.

The module 206 therefore has means to communicate with the relay server 204, and the SMS-C device, as well as with the module 202. These means are interface circuits and driver type programs for these interface circuits. From the viewpoint of the SMS-C equipment, the 206 module can be seen as the relay server 204.

From the sub-step 110, the method passes to a step 112 for the processing of the second notification 330 by the retrieval module 202. The step 112 is carried out for each notification message addressed to the module 202 by the module 206. The software structure of the module 202, for the execution of the step 112, is either a multiple process structure, or an iterative sequential structure. These architectures are already been described for the module 201.

In the step 112, the module 202 extracts the different fields contained in the second notification message 330. The step 112 has a first optional step 113 for the execution of an instruction code. This is an instruction code of the field 313. This instruction code may inform the module 202 that it must retrieve the immediately corresponding multimedia message, within a time limit given by the instruction code, or never retrieve this message. The instruction code can also specify the way in which the corresponding multimedia message must be retrieved, that is by leaving a copy at the relay server 204 or by not leaving any copy. These are only examples of possible instruction codes. Once the instruction code has been interpreted, the method passes to a sub-step 114 for the retrieval of the multimedia message.

In the sub-step 114 and in the exemplary description, the module 202 behaves exactly as would a mobile telephone that had received the notification message 320. That is, the module 202 composes a retrieval message 340 comprising a header field 341, a retrieval instruction code field 342, and a field 343 for the identification of the multimedia message to be retrieved. In practice, the field 342 corresponds to the instruction code 313. If the code 413 has not been transmitted, then the code 342 is a simple code for the retrieval of a multimedia message.

In a preferred variant, the field 342 corresponds to the field 335. In one variant, the field 343 comprises the contents of the field 322, 323 and 312, enabling the designation of the multimedia message on the relay server 204. Indeed, the knowledge of the sender, the recipient and the date of sending make it possible to retrieve a message at the relay server 204.

Once the message 340 has been produced, it is sent to the relay server 204. So as to be as close as possible to the operating conditions of the telecommunications network, the message 340 is sent by the WAP protocol. The module 202 therefore has means to communicate according to this protocol. The message 340 therefore travels, for example, through the gateway 205 before reaching the relay server 204.

From the viewpoint of the relay server 204, the message 340 has been sent by a mobile telephone, or an equivalent apparatus. The message 340 is therefore processed like any message of this type. In practice, the relay server 204 makes a search, in its storage memory, for the multimedia message corresponding to the contents of the field 343. Once this message has been found, it sends it to the apparatus that has sent the retrieval message/request 340. To this end, the field 341 has an address for the response to the message 340. In practice, the response to the message 340 has at least the field 304 and 305. This response may contain the message 300 in its totality.

From the sub-step 114, the method passes to a sub-step 115 for the processing of the response to the message 340. In practice, this processing consists of the composing of a result message 350. A result message comprises a field 351 identifying the multimedia message. This field corresponds to the field 311 produced by the generation module 201. The message 350 also has a date field 352 corresponding to th date of receiving the notification of reception of the multimedia message identified by the field 351. In one variant, the field 351 comprises the difference between the date on which the notification corresponding to the multimedia message was received and the date on which it was sent. This date of sending is available through the field 312. The date of reception of the notification is accessible either because it is present in the first notification message 320 or because it is considered that the date of reception of the second notification message 330 by the module 202 can be likened to the date of reception of the first notification by the module 206. Another possibility lies in the use of the field 326, with the date inserted by the module 206 upon reception of the first notification.

In order to be able to compare the dates of sending and retrieval, at least clocks of the modules 201, 202 and 206 are synchronized so that a same instant has a same date corresponding to it on all three modules. This synchronization is done, for example, by the NTP (Network Time Protocol). The synchronization can also be obtained through a single clock that interrogates the three modules to obtain a date. This synchronization process corresponds to a step 118 whose execution is continuous in time and simultaneous with those of the other steps.

In one variant, the message 350 also has a duration field indicating that time that has elapsed between the sending of the message 340 and the total reception of the response to the message 340.

Finally, the result message 350 comprises a checksum field 353. The field 53 comprises the checksum computed by the module 202 from the contents of the field 305 of the multimedia message retrieved at the sub-step 114. The algorithm used by the module 202 to compute the checksum is the same as the one used by the module 201 to produce the contents of the field 314. In one variant, the field 353 comprises a result of the comparison of the checksums produced by the modules 201 and 202. The result is then expressed, for example, by 0 if there are differences, by 1 if the checksums are identical. In another variant, the contents of the field 353 are identical to the contents of the field 305 retrieved at the sub-step 114. In this case, it is up to the recipient module of the message 350 to compute the checksum on the contents of the field 353.

Once the message 350 has been produced, the method passes to a step 116 for the sending of the results. In the step 116, the module 202 sends the message 350 to the result analysis module 203. The method then goes from the sub-step 116 to a step 117 for synthesizing the sending and retrieval operations.

The step 117 is implemented by the result analysis module 203. In one variant, the module 202 is the same as the module 203.

In the step 117 it is possible, using the field 311 and 351, to correlate the information sent by the module 201 and the result information produced and sent by the module 202. This information is of the same nature and is therefore comparable, whether it comprises dates or checksums. Thus, through the invention, statistics can be obtained on:

a time limit for routing a multimedia message, namely the time that elapses between the sending of the multimedia message and the reception of the notification indicating the reception of the multimedia message by the relay server 204;

a period of time necessary for the retrieval of a multimedia message on the relay server 204;

the number of notifications not sent by the relay server 204 although the module 201 has sent multimedia messages, i.e. in fact, the number of multimedia messages lost;

the number of notifications sent for a same multimedia message;

the number of corrupted multimedia messages received relative to the messages that had been sent;

the number of failures during the sending of the multimedia messages, namely the number of multimedia messages rejected by the relay server 204;

the number of failures during the retrieval of the multimedia messages;

as well as general network statistics during communications between the modules 201 and 202 and the relay server 204. Such statistics relate especially to the quality of communications in terms of number of packets lost, erroneous packets and packets sent again during communications.

Furthermore, with the invention, it is possible to set up statistics as a function of the protocol used by the module 201 to send the multimedia messages as a function of the size of the multimedia messages and/or the nature of the contents of the multimedia messages.

Another useful feature of the invention is that no modification whatsoever is made on the infrastructures of the network such as the relay server 204 or the SMS-C 207.

In one variant of the invention, the module 201 is an intermediary between the server 208 of a service provider and the relay server 204. In such a variant, users link up to the server 208 to produce/send multimedia messages. These messages are intercepted by the module 201 which modifies the subject field of these multimedia messages as described for the step 104. The subject field of a multimedia message thus modified then comprises the old subject field and the field 311 to 314. The messages of notification of reception of modified multimedia messages are intercepted by the module 206 which sends a notification message this time to the module 202 and to the recipient of the multimedia message. The operation of sending to the module 202 is valid only if the notification message is recognized as corresponding to a modified multimedia message. This recognition is made by the structure of the subject field. The subject field of the notification message for the recipient has the additional data produced by the module 201 expunged from it. When the module 202 retrieves the multimedia message, it leaves a copy of it on the relay server 204 so that this message can be retrieved by its recipient. In this variant, the analysis module 203 has the same information as in the main variant It is therefore possible, with the invention, to obtain precise statistics by service providers.

Figure 2A:
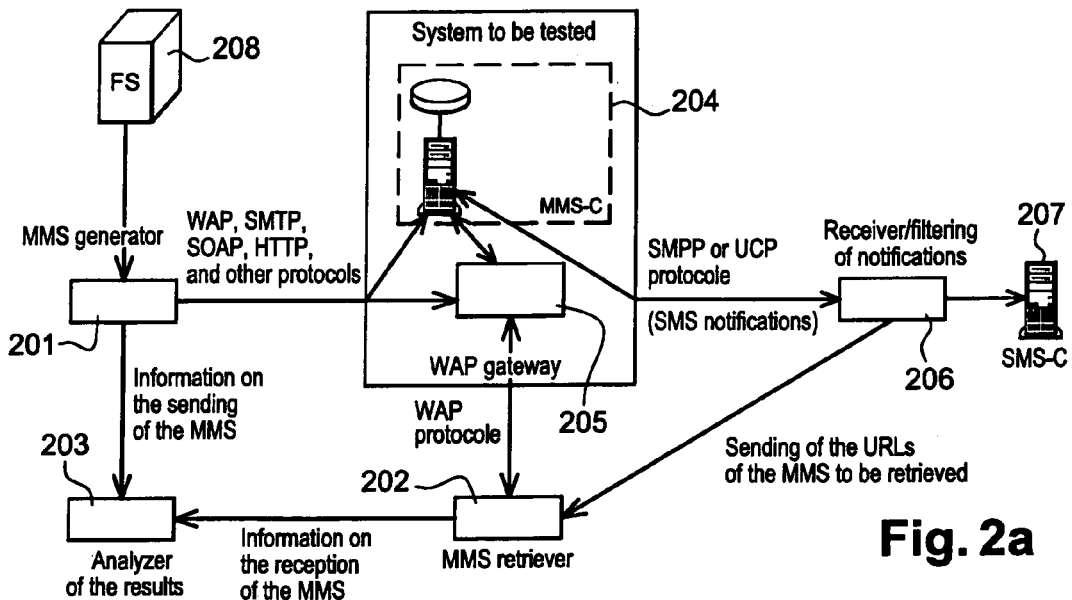
FIG. 2a illustrates an architecture of the device according to the invention.

FIG. 2a illustrates the means implemented by each module. Identical references indicate identical elements.

FIG. 2a shows that the generation module 201 uses the following for its implementation: a microprocessor 251, a program memory 252, communications circuits 253 and 254. The elements 251 to 254 are connected by a bus 255. The memory 252 has instruction codes for the implementation of different communications protocols, in zones 252a–d and 252f, and for the implementation of the function of the module 201, in the zone 252e. The circuits 253 enable the modules 201 to be taken for mobile telephones. The circuits 254 enable the module 201 to communicate through a telecommunications network 240. The module 201 also has a scenario memory 256 enabling the recording of the files for the parametrizing of the module 201. A parametrizing file of this kind is equivalent to the scenario.xml file. The memory 256 connected to the bus 255.

Figure 2B:
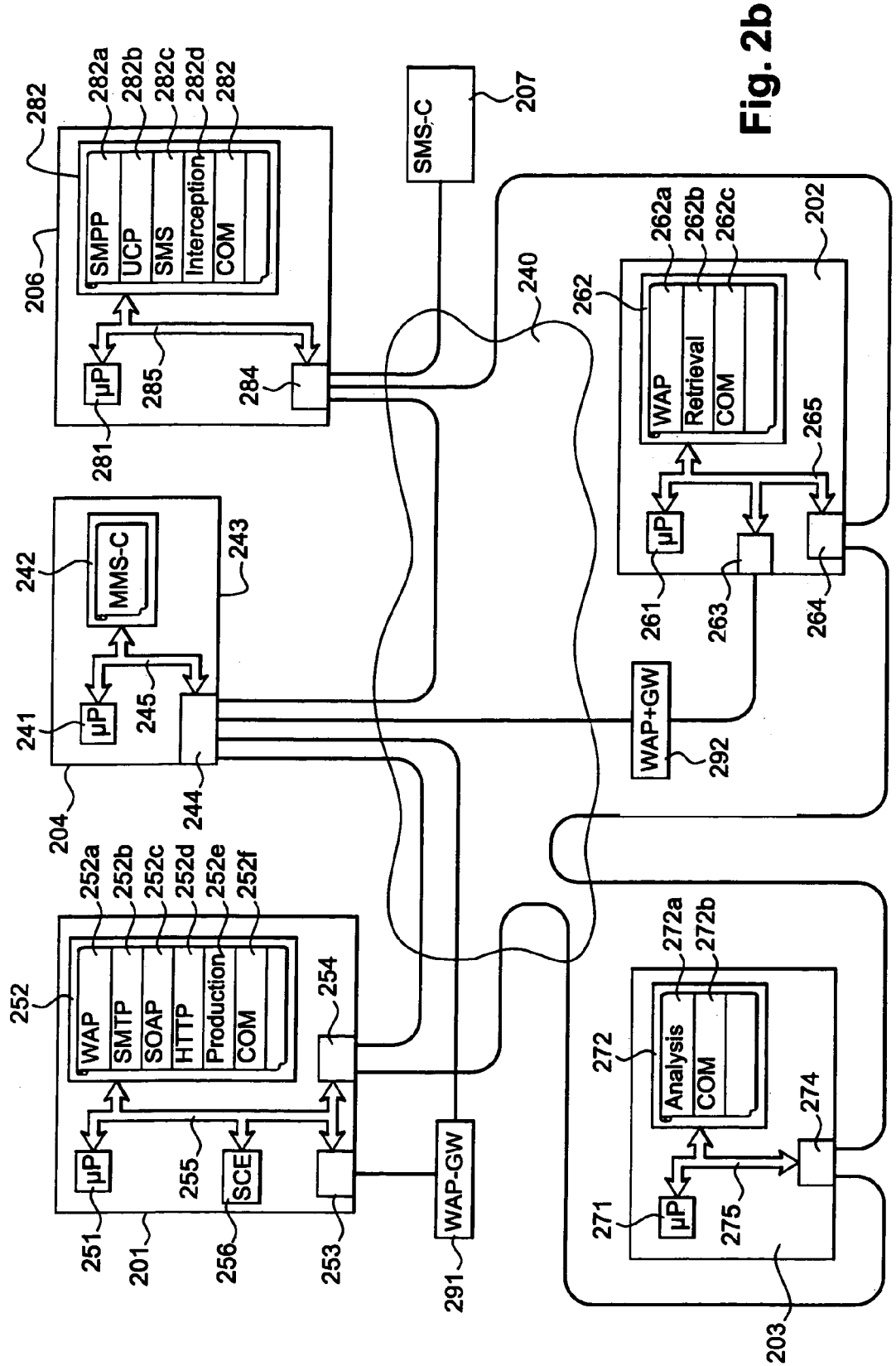
FIG. 2b illustrates means useful to the implementation of the method according to the invention.

In practice the circuits 253 and 263 are connected to WAP gateways 291 and 292 themselves connected to the network 240. The network 240 has all the infrastructures necessary for the efficient routing of the communications. The network 240 is of the Internet type. In practice, the gateways 291 and 292 may be one and the same gateway 205 as shown in FIG. 2. They existence of one or two gateways actually depends on the physical distance between the modules 201 and 202.

FIG. 2a shows that the retrieval module 202 uses the following for its implementation: a microprocessor 261, a program memory 262, communications circuits 263 and 264. The elements 261 to 264 are connected by a bus 265. The memory 262 has instruction codes for the implementation of the different communications protocols, in zones 262a and 262c, and of protocols relating to the function of the module 202, in the zone 262b. The circuits 263 enable the modules 202 to be taken for a mobile telephone. The circuits 264 enable the modules 202 to communicate through the network 240.

FIG. 2a shows that the analysis module 203 uses the following for its implementation: a microprocessor 271, a program memory 272, communication circuits 274. The elements 271 to 274 are connected by a bus 275. The memory 272 has instruction codes for the implementation of different communications protocols, in a zone 272b, and for the implementation of the function of the module 203, in a zone 272a. The circuits 274 enable the module 203 to communicate through the network 240.

FIG. 2a shows that the relay server 204 uses the following for its implementation: a microprocessor 241, a program memory 242, communications circuits 244. The elements 241 to 244 are connected by a bus 245. The memory 242 comprises instruction codes to carry out the functions of an MMS-C. The circuits 244 enable the relay server 204 to communicate through the network 240.

FIG. 2a shows that the interception module 206 uses the following for its implementation: a microprocessor 281, a program memory 282, communication circuits 284. The elements 281 to 284 are connected by a bus 285. The memory 282 has instruction codes for the implementation of different communications protocols, in the zone 282a–c and 282-e, and for the implementation of the function of the module 206, in a zone 282d. The circuits 284 enable the module 206 to communicate through the network 240.

What is claimed is:

1. A modular method for the tracing of a multimedia message through a telecommunications network comprising a relay server of multimedia messages, a multimedia message comprising a recipient field and a subject field wherein:

the multimedia message is produced automatically by a multimedia message generation module;

the generation module inserts information on the automatically produced multimedia message in the subject field of the multimedia message, the multimedia message produced is sent through the telecommunications network, the multimedia message produced and sent is received by the relay server, the relay produces and transmits a first message of notification of reception of the multimedia message to a recipient identified by the recipient field, the first notification message comprising a subject field whose contents comprise at least the information on the subject field of the multimedia message wherein:

an interception module intercepts a notification message sent by the relay server following the reception of the multimedia message, and determines which is the recipient of the first notification message and, as a function of the recipient, behaves transparently in the telecommunications network Or sends a second notification message addressed to a multimedia message retrieval module, the second notification message comprising at least one subject field whose contents enable the identification of the multimedia message corresponding to the first message, the retrieval module produces a retrieval request to retrieve the multimedia message corresponding to the second notification message, and the retrieval module sends the retrieval request to the relay server and processes the response of the relay server, the generation module sends to an analysis module first pieces of information on the multimedia messages sent by the generation module, the retrieval module sends to the analysis module second pieces of information on retrieved multimedia messages, and the first and second pieces of information are of the same nature.

2. A method according to claim 1, wherein the multimedia message is an MMS message.

3. A method according to claim 1, wherein the first notification message is a short message.

4. A method according to claim 1, wherein the retrieval request is sent by using the WAP protocol.

5. A method according to claim 1, wherein the subject field of the multimedia message comprises a piece of information on date.

6. A method according to claim 1, wherein the modules are synchronized.

7. A method according to claim 1, wherein the subject field of the automatically produced multimedia message comprises a piece of checksum information corresponding to a body of the automatically produced multimedia message.

8. A method according to claim 1, wherein the subject field of the automatically produced multimedia message comprises a piece of information for the identification of the automatically produced multimedia message.

9. A method according to claim 1, wherein the subject filed of the automatically produced multimedia message comprises an instruction code to define the behavior of the retrieval module.

10. A method according to claim 1, wherein the interception module processes the data sent by the relay server.

11. A method according to claim 1, wherein the interception module processes the data sent by an SMS-C of the telecommunications network.

12. A method according to claim 1, wherein the multimedia message comprises a body whose contents are variable in size and/or in nature.

13. A method according to claim 1, wherein the generation module sends multimedia messages at a given frequency.

14. A method according to claim 1, wherein the generation module sends multimedia messages during a given period.

15. A method according to claim 1, wherein the generation module sends multimedia messages through different protocols.

16. A method according to claim 1, wherein the notification messages comprise information for the identification of the multimedia message received by the relay server to which they correspond.

17. A method according to claim 1, wherein the generation module is an intermediary between a server of a service provider and the relay server, the generation module then modifying the subject fields of the multimedia messages intercepted by it.

18. A method according to claim 1, wherein the generation module is parametrized through a scenario file.

19. A method according to claim 1, wherein the generation module and/or the retrieval module have a multiprocess software architecture.

20. A modular device for the tracing of a multimedia message through a telecommunications network comprising a multimedia message relay server, a multimedia message comprising a recipient field and a subject field, wherein the modular tracing device comprises:

a generation module for the automatic production of a message, the generation module comprises means for the insertion, in the subject field of the multimedia message, of information on the automatically produced multimedia message, the generation module comprises means to send the multimedia message produced through the telecommunications network, the relay server comprises means for the production and the transmission, to an identified recipient, of a first message of notification of reception of the multimedia message, the first notification message comprising a subject field whose contents comprise at least information of the subject field of the multimedia message, an interception module comprising means to intercept the first notification message, determine which is the recipient of the first notification message and, depending on the recipient, to behave transparently in the telecommunications network or send a second notification message to a multimedia message retrieval module, the second notification message comprising at least one subject field whose contents enable the identification of the multimedia message corresponding to the first notification message, and the retrieval module comprises means to produce a retrieval request to retrieve the multimedia message corresponding to the second notification message, the retrieval module comprising also means to send the retrieval request to the relay server and process the response of the relay server.

21. A device according to claim 20, wherein:

the generation module comprises means to send an analysis module first pieces of information on the multimedia messages sent by the generation module, the retrieval module comprises means to send the analysis module second pieces of information on retrieved multimedia messages, and the first and second pieces of information are of the same nature.

* * * * *